United States Patent
Tseng et al.

(10) Patent No.: US 11,977,745 B2
(45) Date of Patent: May 7, 2024

(54) DATA RETRY-READ METHOD, MEMORY STORAGE DEVICE, AND MEMORY CONTROL CIRCUIT ELEMENT

(71) Applicant: PHISON ELECTRONICS CORP., Miaoli (TW)

(72) Inventors: Ming-Hui Tseng, Hsinchu (TW); Chia-Lung Ma, New Taipei (TW); Zhen-Yu Weng, Taoyuan (TW)

(73) Assignee: PHISON ELECTRONICS CORP., Miaoli (TW)

( * ) Notice: Subject to any disclaimer, the term of this patent is extended or adjusted under 35 U.S.C. 154(b) by 0 days.

(21) Appl. No.: 17/886,416

(22) Filed: Aug. 11, 2022

(65) Prior Publication Data
US 2024/0020021 A1    Jan. 18, 2024

(30) Foreign Application Priority Data
Jul. 14, 2022    (TW) .................................. 111126466

(51) Int. Cl.
*G06F 3/06*    (2006.01)

(52) U.S. Cl.
CPC .......... *G06F 3/0619* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 8,365,015 B1 * | 1/2013 | Yu ......................... G06F 9/3863 714/17 |
| 2018/0018221 A1 * | 1/2018 | Magro ................ G06F 13/4022 |
| 2019/0278514 A1 * | 9/2019 | Chaturvedi ........... G06F 3/0659 |
| 2019/0347158 A1 * | 11/2019 | Chung ................. G06F 11/1044 |
| 2021/0374006 A1 * | 12/2021 | Wang ................ G11C 11/40603 |

* cited by examiner

Primary Examiner — Kaushikkumar M Patel
(74) Attorney, Agent, or Firm — JCIPRNET

(57) ABSTRACT

A data retry-read method, a memory storage device, and a memory control circuit element are provided. The method includes: detecting a notification signal from a volatile memory module; in response to the notification signal, instructing the volatile memory module to execute N command sequences in a buffer; and after the volatile memory module executes the N command sequences, sending at least one read command sequence, according to M physical addresses involved in the N command sequences, to instruct the volatile memory module to read first data from the M physical addresses.

21 Claims, 8 Drawing Sheets

DATA RETRY-READ METHOD, MEMORY STORAGE DEVICE, AND MEMORY CONTROL CIRCUIT ELEMENT

CROSS-REFERENCE TO RELATED APPLICATION

This application claims the priority benefit of Taiwan applications serial no. 111126466, filed on Jul. 14, 2022. The entirety of the above-mentioned patent application is hereby incorporated by reference herein and made a part of this specification.

BACKGROUND

Technical Field

The present disclosure relates to a memory management technology, particularly to a data retry-read method, a memory storage device, and a memory control circuit element.

Description of Related Art

The volatile memory module is characterised by its small size and fast data access. Therefore, it is suitable to install a volatile memory module in various electronic devices to act as a storage medium for temporary data.

Generally, when a volatile memory module encounters an access error (such as not recognizing a command from the memory controller), the memory controller instructs the volatile memory module to re-execute some of the previously executed operation commands in an attempt to complete the work that has not been completed. However, if the re-executed command includes a read command, the read data includes a mixture of both old and new data.

SUMMARY

The disclosure provides a data retry-read method, a memory storage device, and a memory control circuit element capable of improving the operation stability and data access performance of a volatile memory module.

Exemplary embodiments of the disclosure provide a data retry-read method for a volatile memory module. The data retry-read method includes: detecting a notification signal from the volatile memory module; in response to the notification signal, instructing the volatile memory module to execute N command sequences in a buffer; and after executing the N command sequences, sending at least one read command sequence, according to M physical addresses involved in the N command sequences, to instruct the volatile memory module to read first data from the M physical addresses.

Exemplary embodiments of the disclosure further provide a memory storage device, and the memory storage device includes a connection interface element, a volatile memory module, and a memory control circuit element. The connection interface element is adapted for coupling to a host system. The memory control circuit element is coupled to the connection interface element and the volatile memory module. The memory control circuit element is configured to: detect a notification signal from the volatile memory module; in response to the notification signal, instruct the volatile memory module to execute N command sequences in a buffer; and after the volatile memory module executes the N command sequences, send at least one read command sequence, according to M physical addresses involved in the N command sequences, to instruct the volatile memory module to read first data from the M physical addresses.

Exemplary embodiments of the disclosure further provide a memory control circuit element for controlling a volatile memory module, and the memory control circuit element includes a host interface, a memory interface, and a memory management circuit. The host interface is adapted for coupling to the host system. The memory interface is adapted for coupling to the volatile memory module. The memory management circuit is coupled to the host interface and the memory interface. The memory management circuit is configured to: detect a notification signal from the volatile memory module; in response to the notification signal, instruct the volatile memory module to execute N command sequences in a buffer; and after the volatile memory module executes the N command sequences, send at least one read command sequence, according to M physical addresses involved in the N command sequences, to instruct the volatile memory module to read first data from the M physical addresses.

Based on the above, after detecting the notification signal from the volatile memory module, the volatile memory module executes the N command sequences in the buffer in response to the notification signal. In particular, after the volatile memory module executes the N command sequences, at least one read command sequence may be sent according to the M physical addresses involved in the N command sequences to instruct the volatile memory module to read the first data from the M physical addresses. In this way, it is ensured that the data (i.e., the first data) read through data retry-reading is the latest data, thereby reducing the occurrence of obtaining a mixture of both old and new data.

DESCRIPTION OF THE EMBODIMENTS

Figure 1:
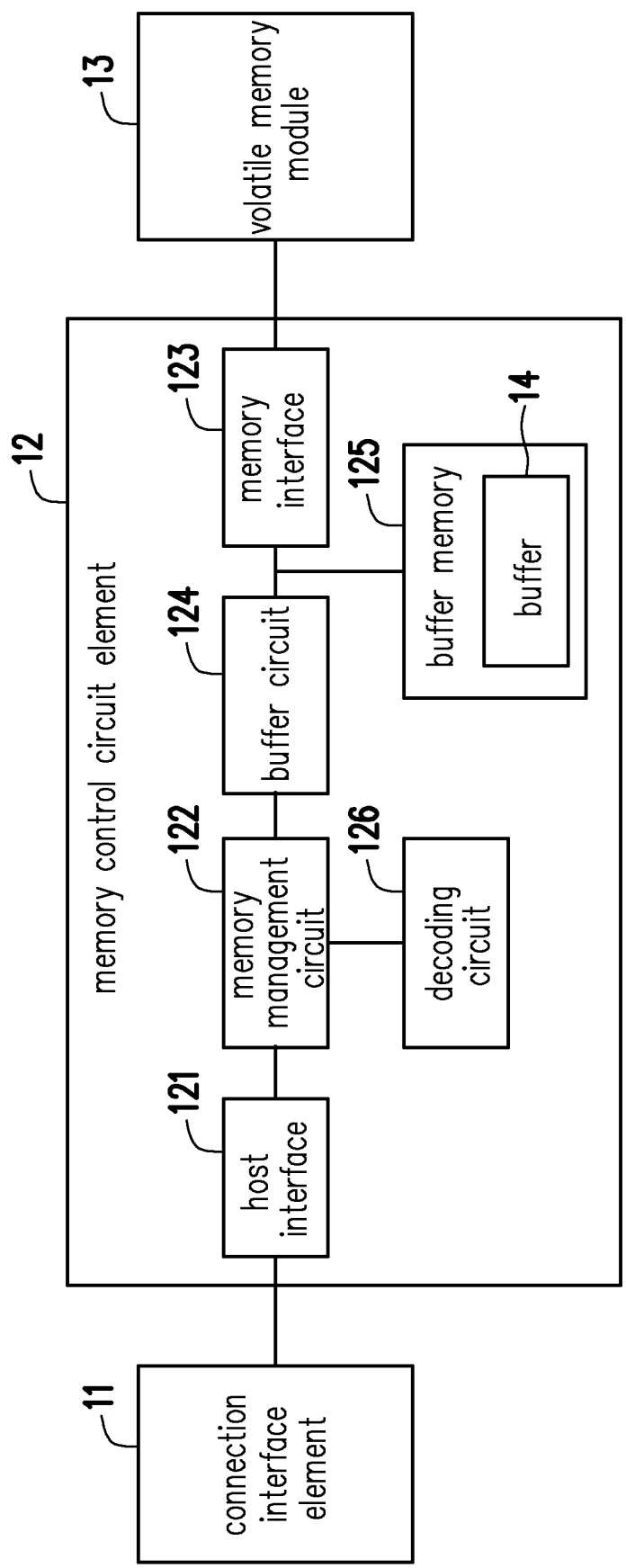
FIG. 1 is a schematic diagram of a memory storage device according to an exemplary embodiment of the disclosure.

FIG. 1 is a schematic diagram of a memory storage device according to an exemplary embodiment of the disclosure. As shown in FIG. 1, the memory storage device 10 includes a connection interface element 11, a memory control circuit element 12, and a volatile memory module 13.

The connection interface element 11 is adapted to couple the memory storage device 10 to the host system. The memory storage device 10 communicates with the host system through the connection interface element 11. In an exemplary embodiment, the connection interface element 11 is compatible with the Peripheral Component Interconnect Express (PCI Express) standard. In an exemplary embodiment, the connection interface element 11 may also conform to a Serial Advanced Technology Attachment (SATA) standard, Parallel Advanced Technology Attachment (PATA) standard, Institute of Electrical and Electronics Engineers (IEEE) 1394 standard, Universal Serial Bus (USB) standard, SD interface standard, Ultra High Speed-I (UHS-I) interface standard, Ultra High Speed-II (UHS-II) interface standard, Memory Stick (MS) interface standard, MCP interface standard, MMC interface standard, eMMC interface standard, the Universal Flash Storage (UFS) interface standard, eMCP Interface standard, CF interface standard, Integrated Device Electronics (IDE) standard, or other suitable standard. The connection interface element 11 and the memory control circuit element 12 may be packaged in a chip, or the connection interface element 11 may be disposed outside a chip including the memory control circuit element 12.

The memory control circuit element 12 is coupled to the connection interface element 11 and the volatile memory module 13. The memory control circuit element 12 is configured to execute a plurality of logic gates or control commands implemented in hardware or a firmware. The memory control circuit element 12 is adapted to control the volatile memory module 13. For example, the memory control circuit element 12 includes a memory controller to instruct the volatile memory module 13 to perform operations such as writing, reading, and deleting data. In addition, the memory control circuit element 12 includes a central processing unit (CPU) or other programmable general-purpose or special-purpose microprocessors, digital signal processors (DSPs), or other programmable general-purpose or special-purpose microprocessors, programmable controllers, application specific integrated circuits (ASICs), programmable logic devices (PLDs), or other similar devices or combinations of these devices.

The volatile memory module 13 is adapted to store data volatilely. For example, the volatile memory module 13 includes various types of random access memory (RAM). For example, the volatile memory module 13 includes a double data rate synchronous dynamic random access memory (DDR SDRAM), such as DDR SDRAM, DDR2 SDRAM, DDR3 SDRAM, DDR4 SDRAM, DDR5 SDRAM, or other types of non-volatile memory.

The memory control circuit element 12 includes a host interface 121, a memory management circuit 122, a memory interface 123, a buffer circuit 124, a buffer memory 125, and a decoding circuit 126. The host interface 121 is adapted to couple the memory control circuit element 12 to the host system. The memory control circuit element 12 communicates with the host system through the host interface 121. For example, the host interface 121 may be compatible with PCI Express standard, SATA standard, PATA standard, IEEE 1394 standard, USB standard, SD standard, UHS-I standard, UHS-II standard, MS standard, MMC standard, eMMC standard, UFS standard, CF standard, IDE standard, or other suitable data transmission standard.

The memory management circuit 122 is coupled to the host interface 121, the memory interface 123, the buffer circuit 124, the buffer memory 125, and the decoding circuit 126. The memory management circuit 122 is responsible for the whole or part of the operation of the memory control circuit element 12, and the memory management circuit 122 is adapted to control the volatile memory module 13. For example, based on a read command, write command, or delete command issued from the host system, the memory management circuit 122 sends corresponding command sequences to the volatile memory module 13 to instruct the volatile memory module 13 to perform operations, such as writing, reading, or erasing data. In the following exemplary embodiments, the description of the memory management circuit 122 is equivalent to the description of the memory control circuit element 12.

The memory interface 123 is configured to access the volatile memory module 13. For example, the memory management circuit 122 accesses the volatile memory module 13 through the memory interface 123. For example, the memory management circuit 122 transmits various commands in the form of command sequences to the volatile memory module 13 through the memory interface 123 to instruct the volatile memory module 13 to perform operations, such as writing, reading, and erasing data. For example, the command sequences include information such as the identification code of the instruction and the physical address to be accessed (i.e., the memory address). In an exemplary embodiment, the command sequences are also referred to as an instruction code.

The buffer circuit 124 is coupled between the memory management circuit 122 and the memory interface 123. Alternatively, the buffer circuit 124 may be disposed in the memory management circuit 122 or the memory interface 123. The buffer circuit 124 is configured to temporarily store the command sequences issued by the memory management circuit 122 and to be transmitted to the volatile memory module 13. For example, when the memory management circuit 122 continuously issues multiple command sequences, the buffer circuit 124 first receives and stores the command sequences temporarily, and then transmits the command sequences to the volatile memory module 13 one by one for execution by the volatile memory module 13. According to the command sequences from buffer circuit 124, the volatile memory module 13 can perform data access behaviors such as data writing, reading, and erasing to specific physical addresses (i.e., memory addresses) in the volatile memory module 13.

The buffer memory 125 includes a buffer 14. The buffer 14 is adapted to store multiple command sequences. The buffer 14 may be particularly dedicated to storing command sequences that have been transmitted to the volatile memory module 13 and/or command sequences that have been executed by the volatile memory module 13. Additionally, the depth of buffer 14 may affect the total number of command sequences stored in the buffer 14.

The decoding circuit 126 is also referred to as an error checking and correction circuit. The decoding circuit 126 is adapted to perform error checking and correction operations to ensure the correctness of the data. For example, when data is read from the volatile memory module 13, the decoding circuit 126 performs the error checking and correction operations on the read data to correct errors in the data. For example, the decoding circuit 126 uses various encoding/decoding algorithms, such as low-density parity-check code (LDPC code) or BCH code, to perform data encoding and decoding, which is not limited in the disclosure. Since the decoding circuit 126 is a common circuit module in a memory storage device, its working principle is not described herein.

In an exemplary embodiment, the memory management circuit 122 sends at least one command sequence into the buffer circuit 124. The memory management circuit 122 instructs the volatile memory module 13 to execute the command sequences in the buffer circuit 124. Meanwhile, the memory management circuit 122 stores in the buffer circuit 14 the command sequences that have been transmitted to the volatile memory module 13 or have been executed by the volatile memory module 13 in the buffer circuit 124. For example, the command sequences transmitted to the volatile memory module 13 through the buffer circuit 124 for execution may be copied or backed up in the buffer 14.

In an example embodiment, during the process of data access by the volatile memory module 13 according to the command sequences from the buffer circuit 124, the volatile memory module 13 transmits a notification signal to the memory management circuit 122. This notification signal indicates the occurrence of an access error of the volatile memory module 13. For example, when the volatile memory module 13 cannot identify a specific command sequences from the buffer circuit 124 or the volatile memory module 13 fails to access a specific physical address, the volatile memory module 13 sends the notification signal to the memory management circuit 122. In an exemplary embodiment, the notification signal includes a warning signal indicating that an access error has occurred in the volatile memory module 13.

In response to the notification signal, the memory management circuit 122 instructs the volatile memory module 13 to re-execute the N command sequences in the buffer 14, in which "N" may be any integer greater than 1, and the value of N may be less than the depth of buffer 14 or the total number of all command sequences currently stored in the buffer 14.

In an exemplary embodiment, in response to the notification signal, the volatile memory module 13 automatically executes the previously executed data access behavior according to the N command sequences in the buffer 14. For example, according to at least one read command sequence in the N command sequences, the volatile memory module 13 reads the data (also referred to as the second data) from M physical addresses in the volatile memory module 13, in which "M" may be any positive integer, and the value of M may be the same or different from N. Alternatively, according to at least one write command sequences in the N command sequences, the volatile memory module 13 stores specific data to a specific physical address in the volatile memory module 13.

After the volatile memory module 13 executes the N command sequences in the buffer 14 (including reading second data from the M physical addresses), the memory management circuit 122 resends at least one read command sequence according to the M physical addresses involved in the N command sequences. The read command sequences are adapted to instruct the volatile memory module 13 to read data (also referred to as first data) from the M physical addresses again. Note that the first data and the second data are both read from the same M physical addresses in the volatile memory module 13, but the data content of the first data may be the same or different from that of the second data.

In an exemplary embodiment, the memory management circuit 122 marks the read second data as invalid data, and the decoding circuit 126 does not decode the second data. For example, the second data marked as invalid data may be discarded and not analyzed. However, after reading the first data, the decoding circuit 126 decodes the first data in an attempt to correct errors in the first data. The decoded first data is subsequently transmitted to the host system or is subjected to other processes performed.

In an exemplary embodiment, after detecting the notification signal, in response to the notification signal, the memory management circuit 122 stops (or suspends) adding a new command sequences to the buffer circuit 124. Meanwhile, the memory management circuit 122 instructs the volatile memory module 13 to execute the command sequences still temporarily stored in the buffer circuit 124. After the volatile memory module 13 completes all command sequences in the buffer circuit 124, the command sequences in the buffer circuit 124 are allowed to be cleared, and the memory management circuit 122 instructs the volatile memory module 13 to execute the N command sequences in the buffer 14 (including reading the second data from the M physical addresses).

In an exemplary embodiment, in response to the notification signal, the memory management circuit 122 stops (or suspends) adding a new command sequences to the buffer circuit 124. Meanwhile, the memory management circuit 122 instructs the volatile memory module 13 to execute the N command sequences in the buffer 14 (including reading the second data from the M physical addresses). After the volatile memory module 13 re-executes the N command sequences in the buffer circuit 14, the memory management circuit 122 instructs the volatile memory module 13 to execute the command sequences still temporarily stored in the buffer circuit 124. After the volatile memory module 13 completes all command sequences in the buffer circuit 124, the command sequences in the buffer circuit 124 are allowed to be cleared.

In an example embodiment, after the volatile memory module 13 completes all the command sequences in the buffer circuit 124 (that is, the command sequences in the buffer circuit 124 have been cleared) and the N command sequences in the buffer circuit 14 are also re-executed, the memory management circuit 122 resends the at least one read command sequence according to the M physical addresses involved in the N command sequences, to instruct the volatile memory module 13 to read the first data from the M physical addresses again.

Figure 2:
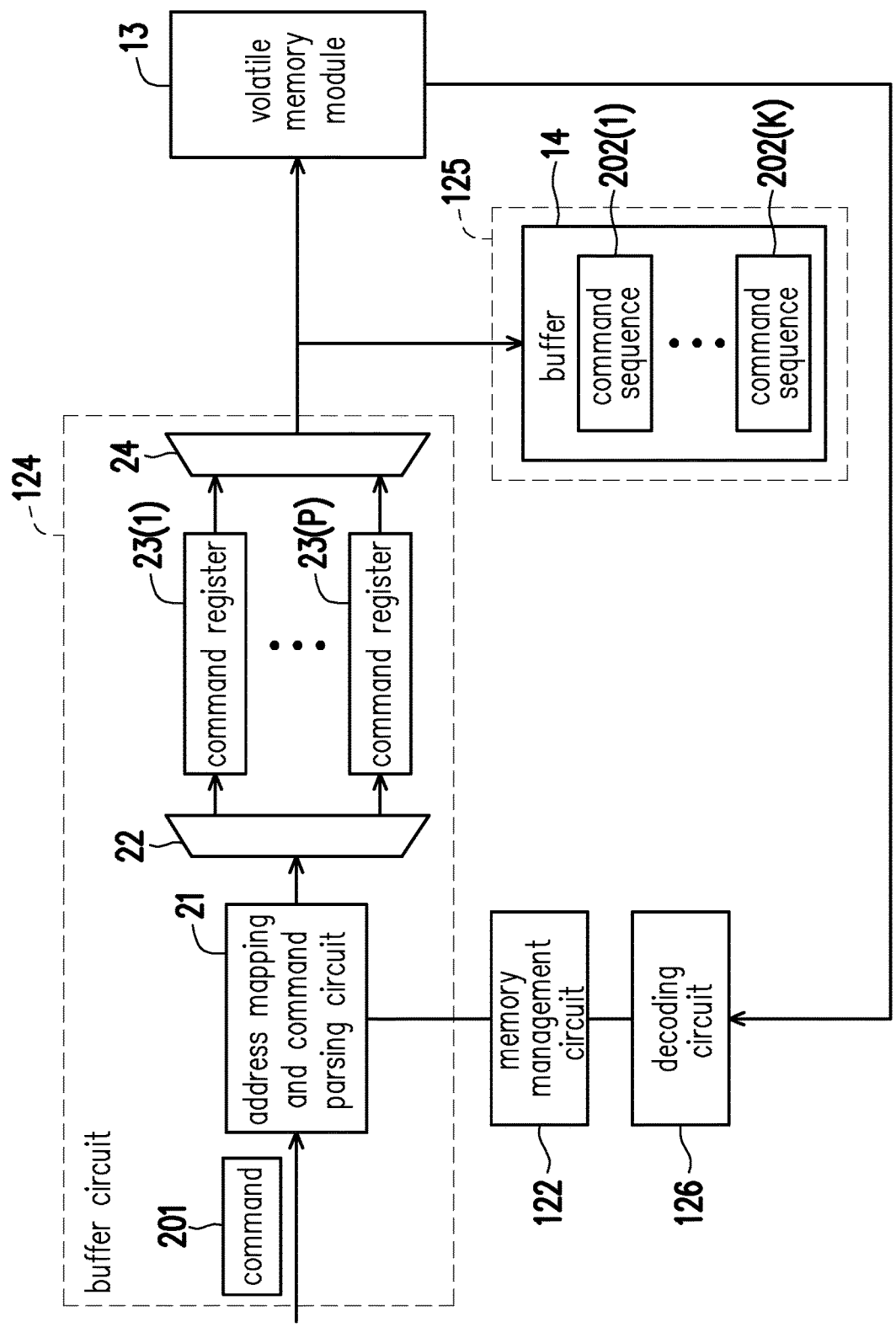
FIG. 2 is a schematic diagram of performing data access to a volatile memory module according to an exemplary embodiment of the disclosure.

FIG. 2 is a schematic diagram of performing data access to a volatile memory module according to an exemplary embodiment of the disclosure. As shown in FIG. 2, in an exemplary embodiment, the buffer circuit 124 includes an address mapping and command parsing circuit 21, a multiplexer (also called a first multiplexer) 22, command registers 23(1) to 23(P), and a multiplexer (also called a second multiplexer) 24. The multiplexer 22 is coupled between the output end of the address mapping and command parsing circuit 21 and the input ends of the command registers 23(1) to 23(P). The multiplexer 24 is coupled to the output ends of the command registers 23(1) to 23(P).

Upon receiving the command 201, the address mapping and command parsing circuit 21 performs address mapping and command parsing on the command 201. For example, the address mapping and command parsing circuit 21 performs address mapping on the logical address accessed by the command 201 to obtain the physical address mapped by the logical address. For example, the address mapping and command parsing circuit 21 parses the command 201 to determine the type of the command 201 (whether it may be, for example, a read instruction or a write instruction). Next, the address mapping and command parsing circuit 21 sends the command sequences corresponding to the command 201 into one of the command registers 23(1) to 23(P) through the multiplexer 22. The multiplexer 24 sequentially outputs the command sequences in the command registers 23(1) to 23(P) according to a preset rule. For example, when it is the turn of the command sequence corresponding to command 201 to be output, one of the command registers 23(1) to 23(P) transmits the command sequences corresponding to the command 201 to the volatile memory module 13 through the multiplexer 24 for the volatile memory module 13 to execute the corresponding access operation.

On the other hand, the command sequences transmitted to the volatile memory module 13 through the multiplexer 24 are also backed up in the buffer 14 one by one. For example, command sequences 202(1) to 202(K) currently backed up in the buffer 14 include command sequences corresponding to the command 201 newly added to the buffer 14. In addition, the command sequences 202(1) to 202(K) may be ordered in the buffer 14 according to First In First Out (FIFO) mode.

After the volatile memory module 13 receives and executes the command sequences corresponding to the command 201, assuming that the command 201 is a read command, the volatile memory module 13 transmits the data read from the specific physical address in the volatile memory module 13 corresponding to the command 201 to the decoding circuit 126 for decoding. Or, if the command 201 is a write command, the volatile memory module 13 stores the data indicated by the command 201 to a specific physical address in the volatile memory module 13.

Figure 3:
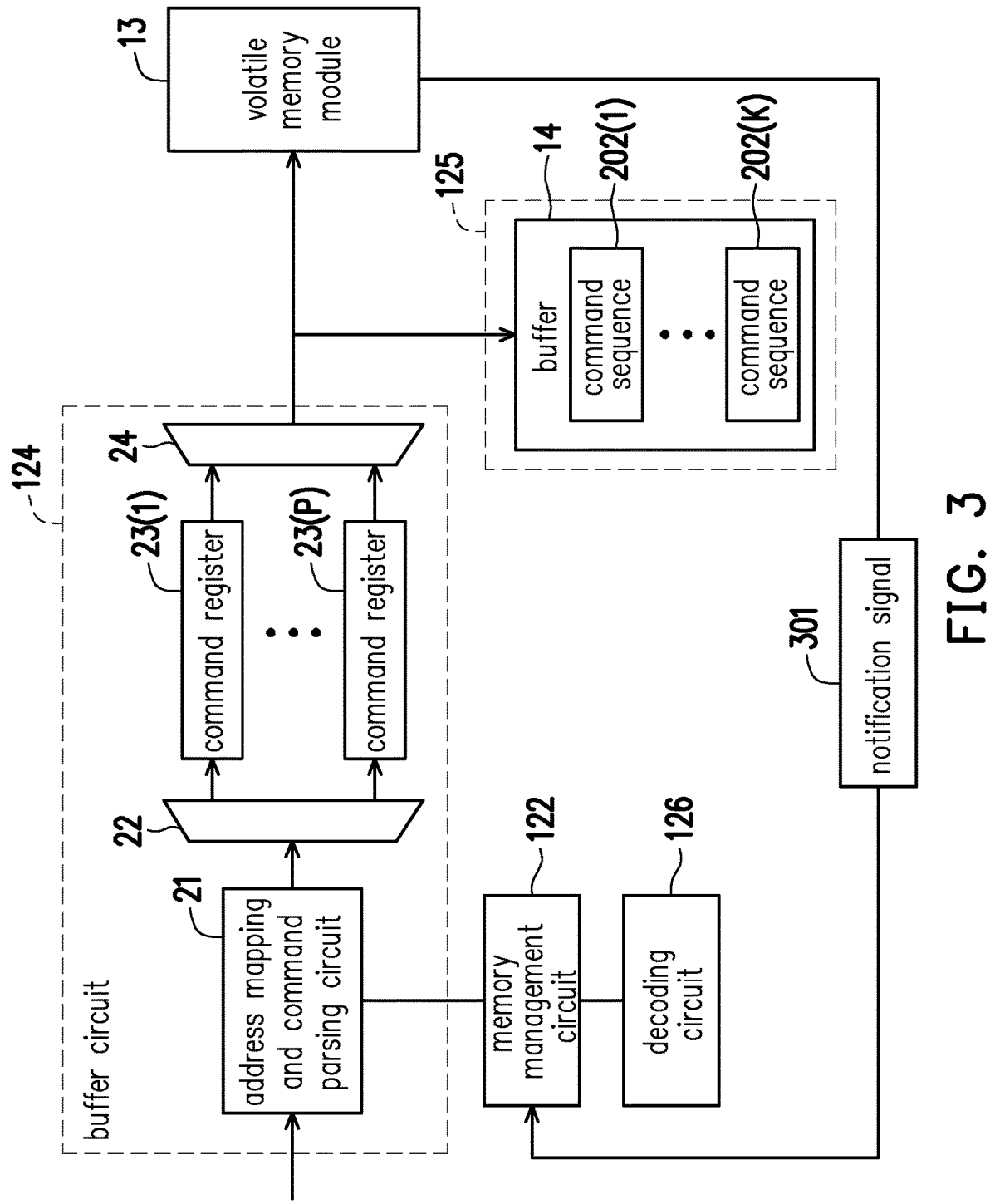
FIG. 3 is a schematic diagram of generating a notification signal when performing data access to a volatile memory module according to an exemplary embodiment of the disclosure.

FIG. 3 is a schematic diagram of generating a notification signal when performing data access to a volatile memory module according to an exemplary embodiment of the disclosure. As shown in FIG. 3, during the process of data access by the volatile memory module 13 according to the command sequences from the buffer circuit 124, the volatile memory module 13 transmits a notification signal 301 to the memory management circuit 122. The notification signal 301 indicates the occurrence of an access error of the volatile memory module 13. For example, when the volatile memory module 13 cannot recognize a specific command sequences from the buffer circuit 124, the volatile memory module 13 generates the notification signal 301.

Figure 4:
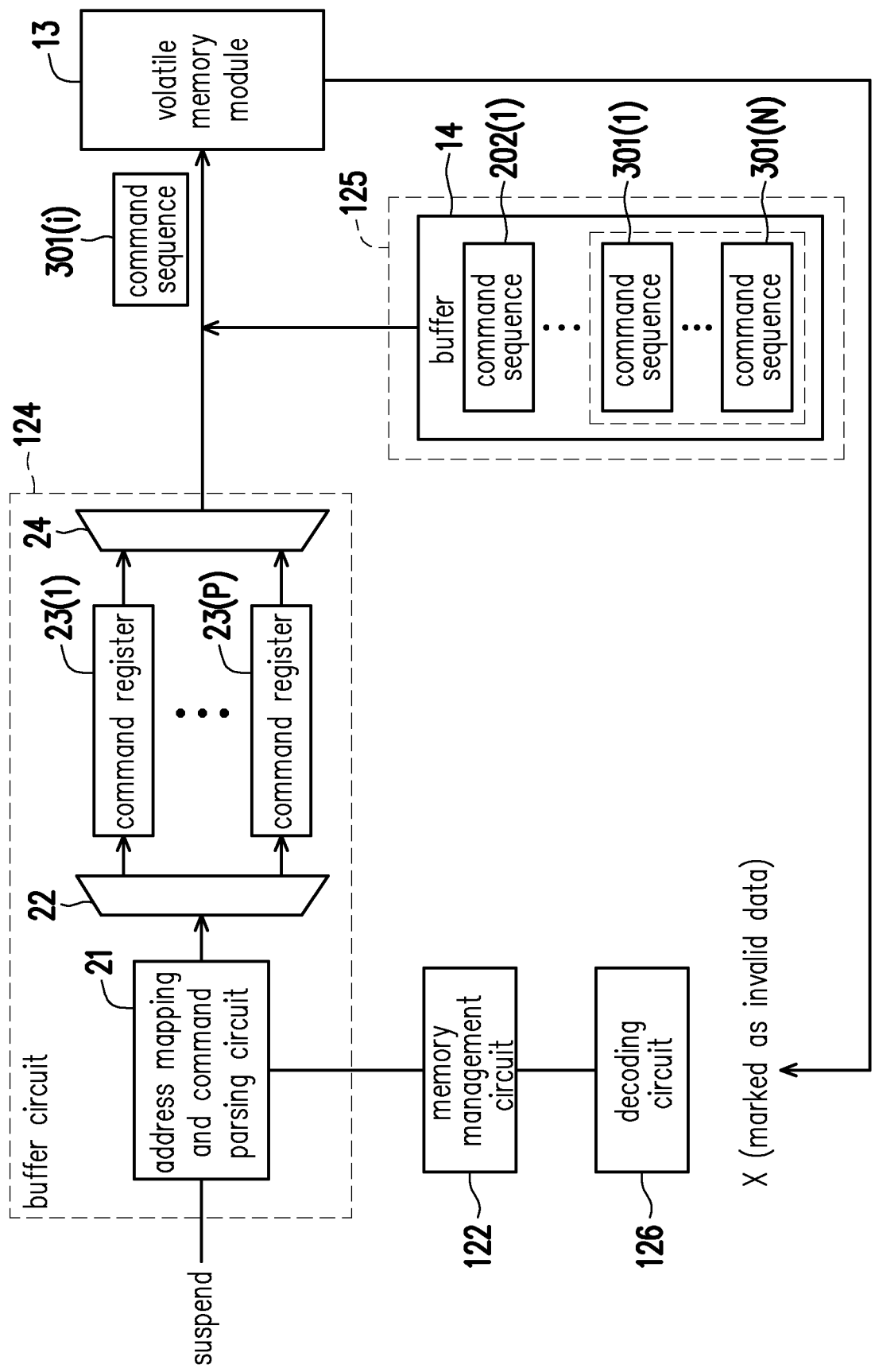
FIG. 4 is a schematic diagram of re-executing N command sequences in a buffer according to a notification signal according to an exemplary embodiment of the disclosure.

FIG. 4 is a schematic diagram of re-executing N command sequences in a buffer according to a notification signal according to an exemplary embodiment of the disclosure. FIG. 4 is a continuation of the exemplary embodiment shown in FIG. 3. In response to the notification signal 301, the memory management circuit 122 defines N command sequences 301(1) to 301(N) from the buffer 14 as command sequences to be re-executed. For example, the command sequences 301(1) to 301(N) may be the command sequences that are added to the buffer 14 relatively late in the buffer 14. Then, the volatile memory module 13 automatically re-executes the command sequences 301(1) to 301(N). For example, the command sequence 301(1) of the command sequences 301(1) to 301(N) may be directly transferred from the buffer 14 to the volatile memory module 13 for execution. After the volatile memory module 13 re-executes the command sequences 301(1) to 301(N), the buffer 14 may be cleared.

On the other hand, in response to the notification signal 301, the memory management circuit 122 stops adding new command sequences to the buffer circuit 124. After the buffer 14 is emptied (that is, after the command sequences 301(1) to 301(N) are re-executed), the memory management circuit 122 instructs the volatile memory module 13 to execute the remaining command sequences still stored in the command registers 23(1) to 23(P) as soon as possible. After the volatile memory module 13 finishes executing the remaining command sequences in the command registers 23(1) to 23(P), the command sequences in the command registers 23(1) to 23(P) (or the buffer circuit 124) may also be cleared.

In an exemplary embodiment, it is assumed that the command sequences 301 (1) to 301 (N) include read command sequences for the M physical addresses in the volatile memory module 13. In the process of re-executing the command sequences 301(1) to 301(N), the data (i.e., the second data) read from the M physical addresses is to be marked as invalid data by the memory management circuit 122, and the M physical addresses may be recorded by the memory management circuit 122. The second data marked as invalid data may be discarded without being analyzed. For example, the decoding circuit 126 does not decode the second data. After clearing the buffer circuit 124 and the buffer 14, the memory management circuit 122 retries reading data (i.e., the first data) from the M physical addresses in the volatile memory module 13 according to the recorded M physical addresses.

Figure 5:
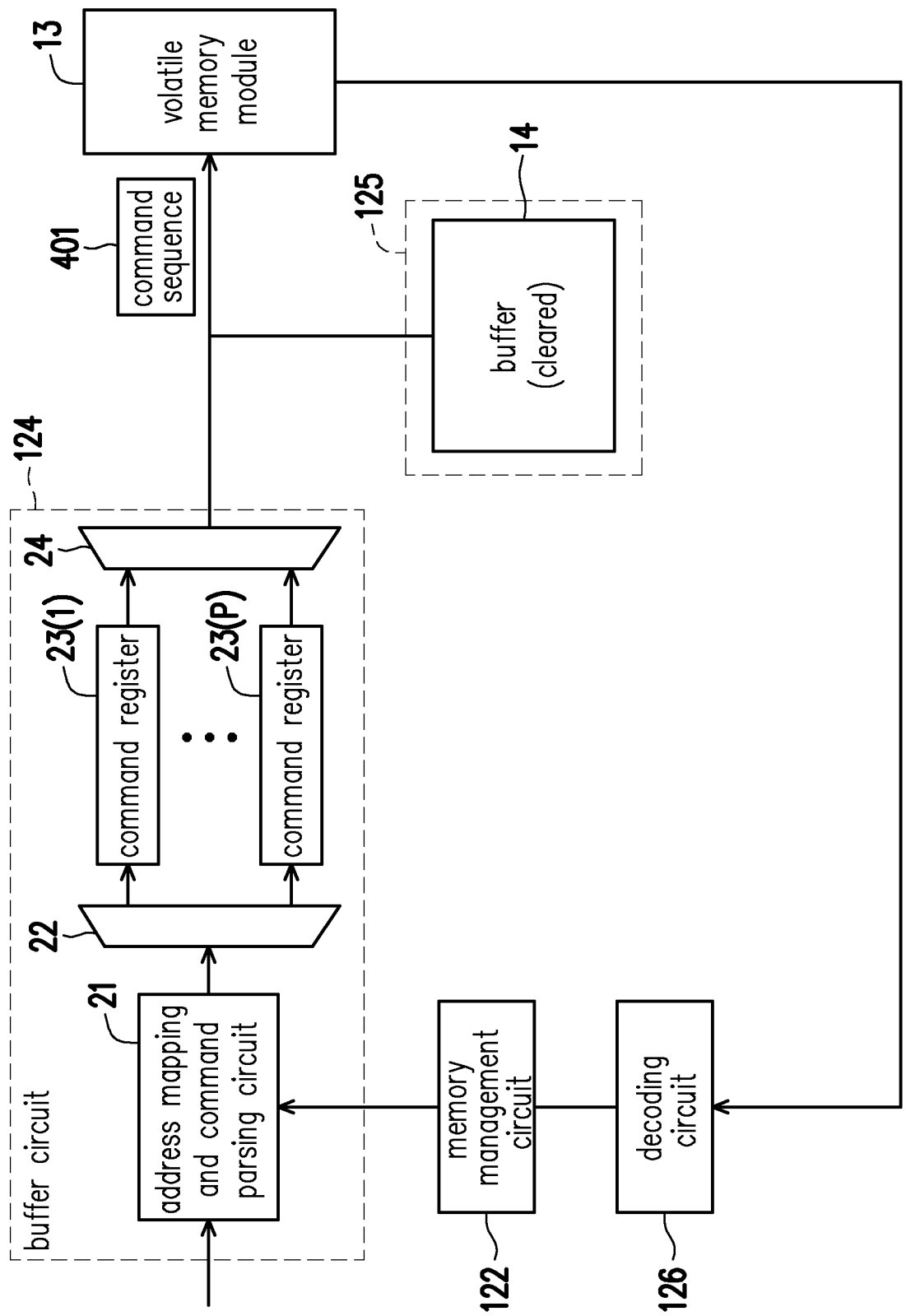
FIG. 5 is a schematic diagram of resending read command sequences after executing N command sequences in a buffer according to an exemplary embodiment of the disclosure.

FIG. 5 is a schematic diagram of resending read command sequences after executing N command sequences in a buffer according to an exemplary embodiment of the disclosure. FIG. 5 is a continuation of the exemplary embodiment shown in FIG. FIG. 4. After clearing the buffer circuit 124 and the buffer 14, the memory management circuit 122 resends at least one read command sequence to the volatile memory module 13 through the buffer circuit 124 according to the M physical addresses involved in the command sequences 301(1) to 301(N), to instruct the volatile memory module 13 to read data (i.e., the first data) from the M physical addresses again. For example, the memory management circuit 122 resends the command sequence 401 to the volatile memory module 13 through the buffer circuit 124 according to one of the M physical addresses. The command sequence 401 instructs the volatile memory module 13 to read data from one of the M physical addresses and return the read data (i.e., the first data) to the decoding circuit 126 for decoding, in an attempt to correct errors in the first data. The decoded first data is subsequently transmitted to the host system or is subjected to other processes performed.

In an example embodiment, compared with the fact that it is possible to read the old data that is to be overwritten later in the process of reading the second data, the reading of the first data is performed after the volatile memory module 13 completes all the command sequences in the buffer circuit 124, and the N command sequences in the buffer 14 are also re-executed, such that the first data read subsequently may be guaranteed to be the latest data, reducing the situation where both old and new data are mixed in the read data. On the other hand, by replacing the second data with the first data, after the notification signal is detected, the accuracy of the data read by performing data retry-reading on the volatile memory module 13 may be improved, thereby improving the operational stability of the system.

Note that the structure of the buffer circuit 124 in the exemplary embodiments of FIG. 3 to FIG. 5 serves only as an example, which is not intended to limit the disclosure. In another exemplary embodiment, the internal structure of the buffer circuit 124 may also be adjusted, which is not limited in the disclosure. For example, in an exemplary embodiment, the address mapping and command parsing circuit 21 may also be regarded as part of the memory management circuit 122.

In an exemplary embodiment, the memory storage device 10 of FIG. 1 also includes a non-volatile memory module and a controller thereof. The memory storage device 10 may be adopted with a host system, such that the host system is able to write or read data from the memory storage device 10.

Figure 6:
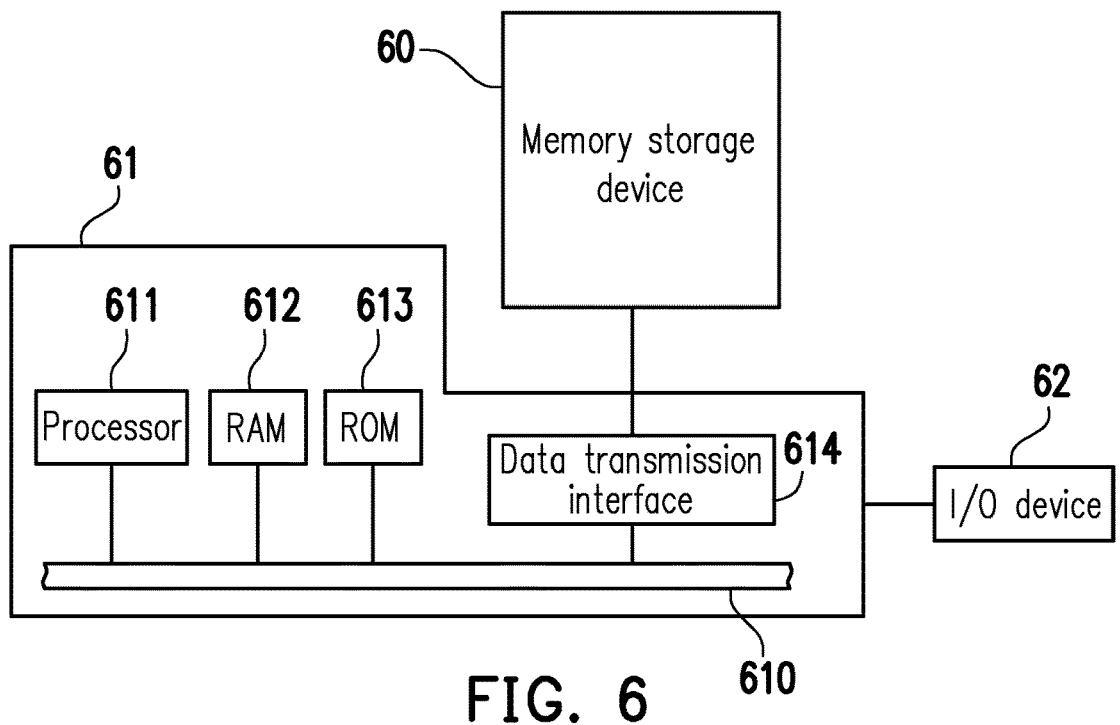
FIG. 6 is a schematic diagram of a host system, a memory storage device, and an input/output (I/O) device according to an exemplary embodiment of the disclosure.
Figure 7:
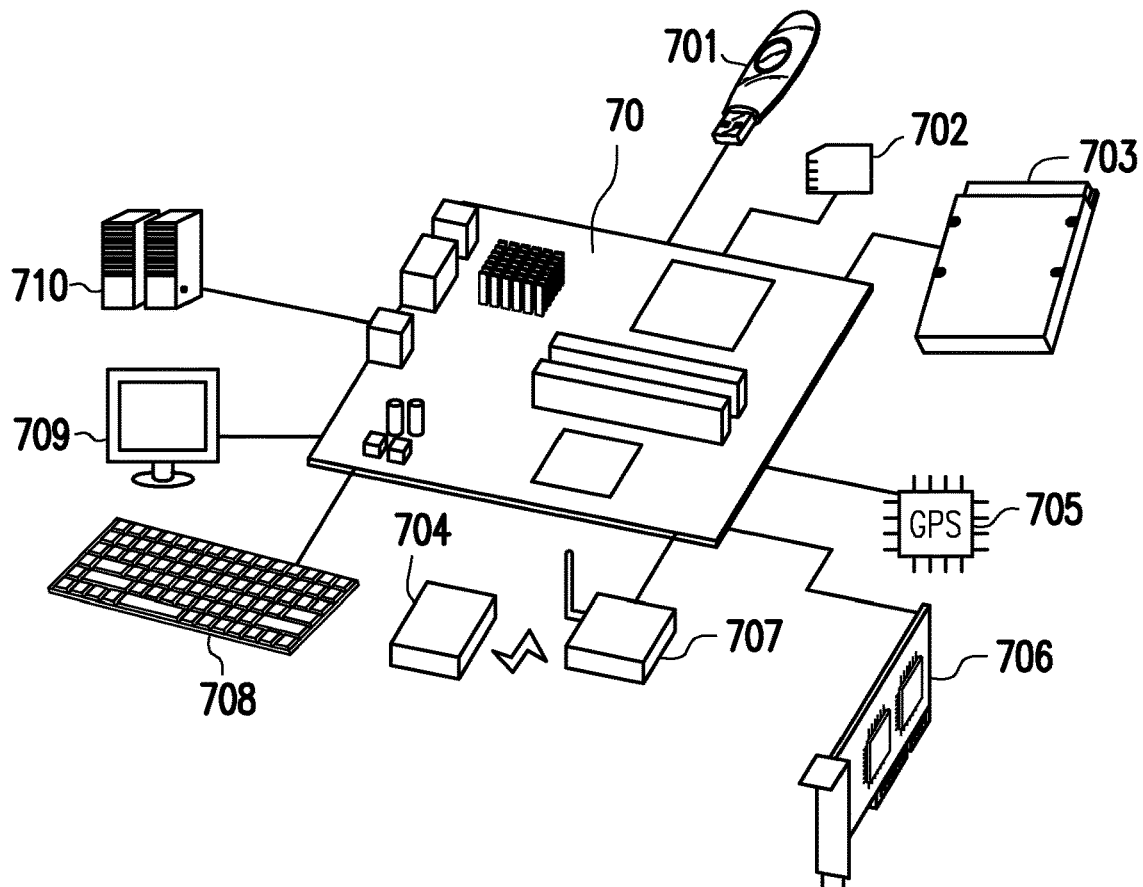
FIG. 7 is a schematic diagram of a host system, a memory storage device, and an I/O device according to an exemplary embodiment of the disclosure.

FIG. 6 is a schematic diagram of a host system, a memory storage device, and an input/output (I/O) device according to an exemplary embodiment of the disclosure. FIG. 7 is a schematic diagram of a host system, a memory storage device, and an I/O device according to an exemplary embodiment of the disclosure.

As shown in FIG. 6 and FIG. 7, the host system 61 includes a processor 611, a random access memory (RAM) 612, a read only memory (ROM) 613, and a data transmission interface 614. The processor 611, the RAM 612, the ROM 613, and the data transmission interface 614 are coupled to a system bus 610.

In an exemplary embodiment, the host system 61 is coupled to the memory storage device 60 through the data transmission interface 614. For example, the host system 61 stores data to or reads data from the memory storage device 60 through the data transmission interface 614. And the host system 61 is coupled to I/O device 62 through system bus 610. For example, the host system 61 transmits output signals to and receives input signals from the I/O device 62 through the system bus 610.

In an exemplary embodiment, the processor 611, the RAM 612, the ROM 613, and the data transmission interface 614 are disposed on a motherboard 70 of the host system 61. The number of the data transmission interface 614 may be one or more. Through the data transmission interface 614, the motherboard 70 is coupled to the memory storage device 60 through wires or wirelessly.

In an example embodiment, the memory storage device 60 is, for example, a flash drive 701, a memory card 702, a solid state drive (SSD) 703, or a wireless memory storage device 704. The wireless memory storage device 704 may be memory storage devices based on various wireless communication technologies, such as: near-field communication (NFC) memory storage devices, wireless fax (WiFi) memory storage devices, Bluetooth memory storage devices, or low energy Bluetooth memory storage devices (e.g., iBeacon). In addition, the motherboard 70 may also be coupled through the system bus 610 to various I/O devices, such as a global positioning system (GPS) module 705, a network interface card 706, a wireless transmission device 707, a keyboard 708, a screen 709, a speaker 710. For example, in an exemplary embodiment, the motherboard 70 is able to access the wireless memory storage device 704 through the wireless transmission device 707.

In an exemplary embodiment, the host system 61 is a computer system. In an exemplary embodiment, the host system 61 is substantially any system that is able to cooperate with the memory storage device 60 to store data. In an exemplary embodiment, the memory storage device 60 and the host system 61 may respectively include a memory storage device 80 and a host system 81 of FIG. 8.

Figure 8:
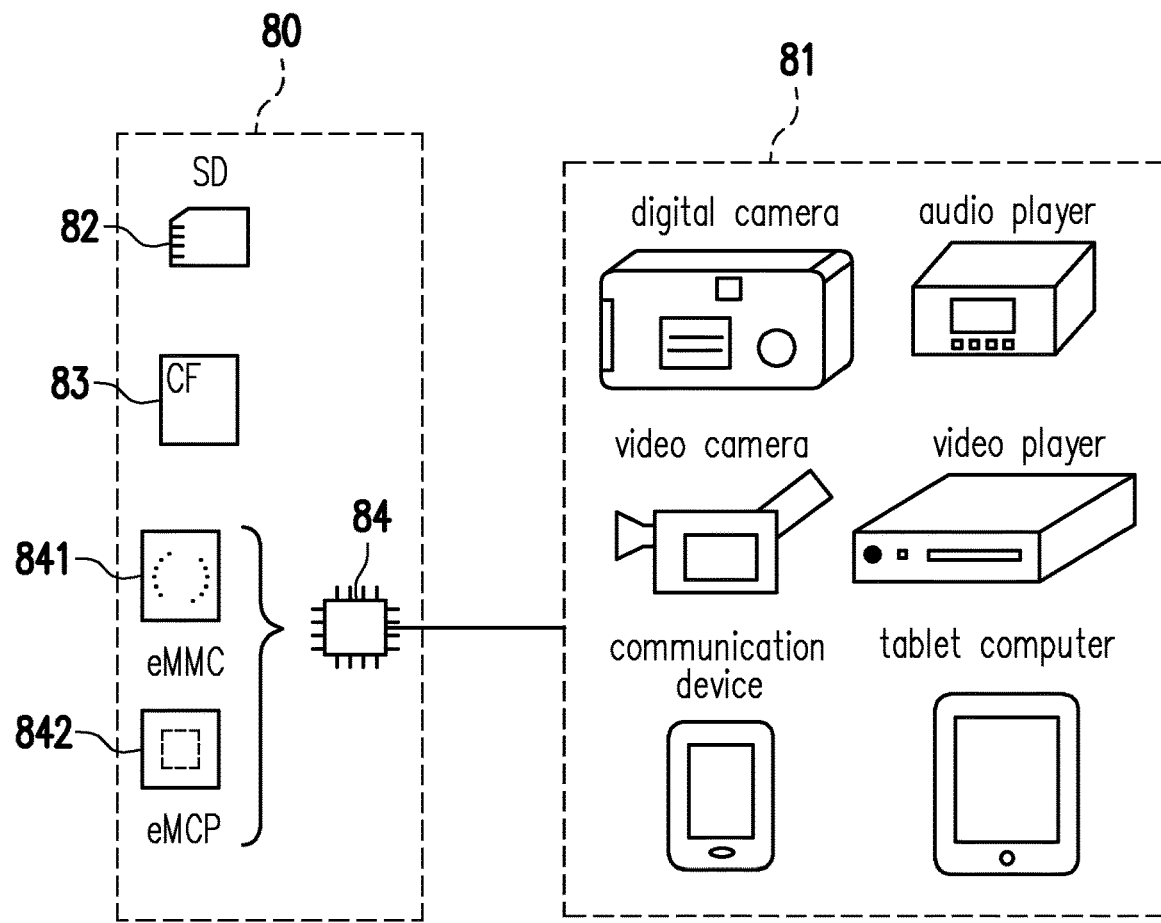
FIG. 8 is a schematic diagram of a host system and a memory storage device according to an exemplary embodiment of the disclosure.

FIG. 8 is a schematic diagram of a host system and a memory storage device according to an exemplary embodiment of the disclosure.

As shown in FIG. 8, the memory storage device 80 may be used in conjunction with the host system 81 to store data. The host system 81 is a system, such as a digital camera, a video camera, a communication device, an audio player, a video player, or a tablet computer. The memory storage device 80 may be, for example, various non-volatile memories, such as a Secure Digital (SD) card 82, a Compact Flash (CF) card 83, or an embedded storage device 84 usable by the host system 81. The embedded storage device 84 includes various embedded storage devices in which the memory module is directly coupled to the substrate of the host system, such as an embedded Multi Media Card (eMMC) 841 and/or an embedded Multi Chip Package (eMCP) storage device 842.

Figure 9:
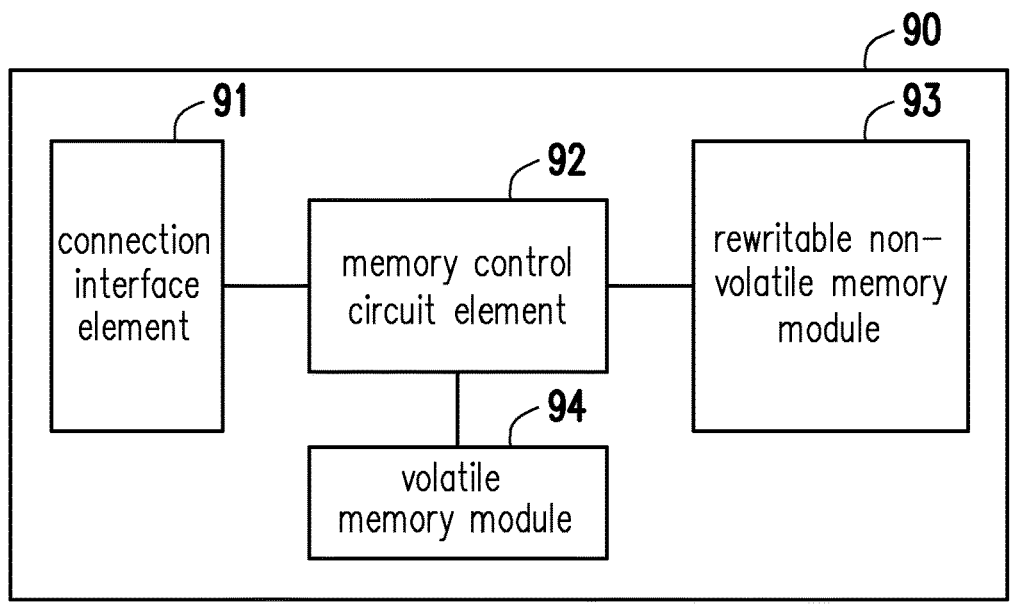
FIG. 9 is a schematic diagram of a memory storage device according to an exemplary embodiment of the disclosure.

FIG. 9 is a schematic diagram of a memory storage device according to an exemplary embodiment of the disclosure.

As shown in FIG. 9, the memory storage device 60 includes a connection interface element 91, a memory control circuit element 92, a rewritable non-volatile memory module 93, and a non-volatile memory module 94.

The connection interface element 91 is adapted to couple the memory storage device 60 to the host system 61, and the memory storage device 60 communicates with the host system 61 through the connection interface element 91. For example, the connection interface element 91 may be compatible with PCI Express standard, SATA standard, PATA standard, IEEE 1394 standard, USB standard, SD standard, UHS-I standard, UHS-II standard, MS standard, MMC standard, eMMC standard, UFS standard, CF standard, IDE standard, or other suitable data transmission standard. The connection interface element 91 and the memory control circuit element 92 may be packaged in one chip, or the connection interface element 91 may be disposed outside a chip including the memory control circuit element 92.

The memory control circuit element 92 is coupled to the connection interface element 91, the rewritable non-volatile memory module 93, and the volatile memory module 94. The memory control circuit element 92 executes a plurality of logic gates or control commands implemented in hardware or firmware, and performs operations such as writing, reading, and deleting data in the rewritable non-volatile memory module 93 according to the commands of the host system 61. In addition, the memory control circuit element 92 includes the memory control circuit element 12 of FIG. 1 to control the volatile memory module 94. As the relevant operation details thereof are described above in detail, the same description is not repeated herein.

The rewritable non-volatile memory module 93 is configured to store the data written by the host system 61. The rewritable non-volatile memory module 93 includes a single-level cell (SLC) NAND-type flash memory module (i.e., a flash memory that stores 1 bit in one memory cell), a multi-level cell (MLC) NAND-type flash memory module (i.e., a flash memory module that stores 2 bits in one memory cell), a triple-level cell (TLC) NAND type flash memory module (i.e., a flash memory module that stores 3 bits in one memory cell), a quad-level cell (QLC) NAND type flash memory module (i.e., a flash memory module that stores 4 bits in one memory cell), other flash memory modules, or other memory modules with the same characteristics.

Each memory cell in the rewritable non-volatile memory module 93 stores one or more bits by changing the voltage (also referred to as the threshold voltage hereinafter). Specifically, there is a charge trapping layer between the control gate and the channel of each memory cell. By applying a write voltage to the control gate, the amount of electrons in the charge trapping layer is changed, thereby changing the threshold voltage of the memory cell. This operation of changing the threshold voltage of the memory cell is also referred to as "writing data to the memory cell" or "programming the memory cell." As the threshold voltage changes, each memory cell in the rewritable non-volatile memory module 43 has a plurality of storage states. By applying a read voltage, it is possible to determine which storage state a memory cell belongs to, thereby obtaining one or more bits stored in the memory cell.

In an exemplary embodiment, the memory cells of the rewritable non-volatile memory module 93 constitute a plurality of physical programming units, and these physical programming units constitute a plurality of physical erasing units. Specifically, memory cells on the same word line form one or more physical programming units. If each memory cell stores more than 2 bits, the physical programming unit on the same word line may be classified into at least a lower physical programming unit and an upper physical programming unit. For example, the least significant bit (LSB) of a memory cell belongs to the next physical programming unit, and the most significant bit (MSB) of a memory cell belongs to the physical programming unit. Generally, in a MLC NAND-type flash memory, the writing speed of the lower physical programming unit is higher than that of the upper physical programming unit, and/or the reliability of the lower physical programming unit is higher than that of the upper physical programming unit.

In an exemplary embodiment, the physical programming unit is the smallest unit of programming. In other words, the physical programming unit is the smallest unit in which data is written. For example, the physical programming unit may be a physical page or a physical sector. If the physical programming units are physical pages, the physical programming unit includes data bit regions and redundancy bit regions. The data bit area includes a plurality of physical sectors for storing user data, and the redundant bit area is configured to store system data (e.g., management data, such as error correction codes). In an exemplary embodiment, the data byte area includes 32 physical sectors, and the size of one physical sector is 512 bytes (B). However, in other exemplary embodiments, the data bit region may also include 8, 16, or more or less physical sectors, and the size of each physical sector may also be larger or smaller. On the other hand, the physical erasing unit is the smallest unit of erasing. In other words, each physical erase unit contains a minimum number of memory cells that are erased. For example, the physical erasing unit is a physical block.

Figure 10:
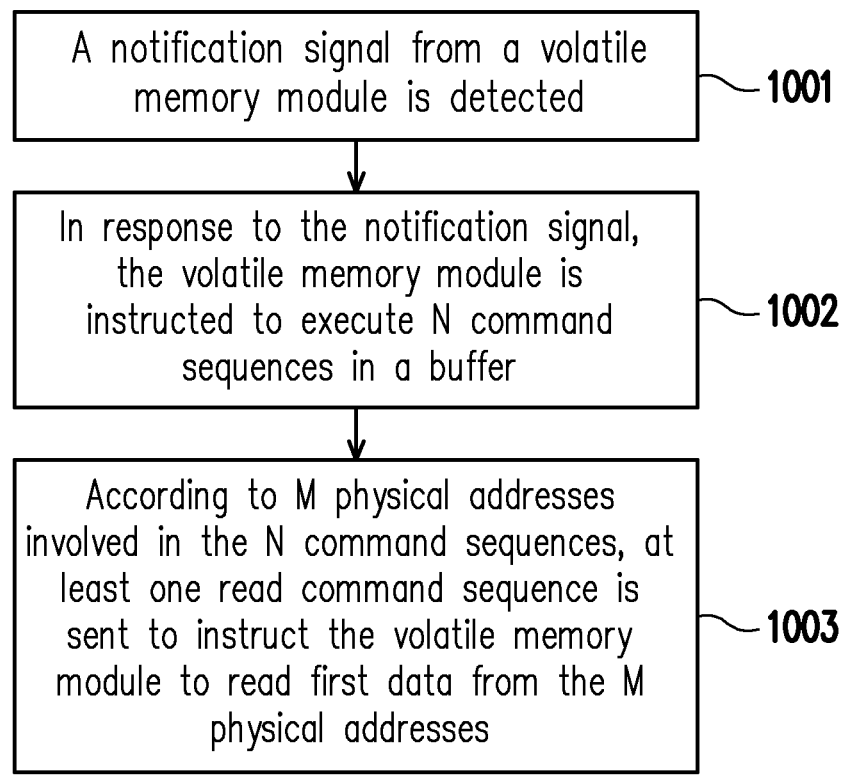
FIG. 10 is a flowchart of a data retry-read method according to an exemplary embodiment of the disclosure.

FIG. 10 is a flowchart of a data retry-read method according to an exemplary embodiment of the disclosure. As shown in FIG. 10, in step 1001, a notification signal from a volatile memory module is detected. In step 1002, in response to the notification signal, the volatile memory module is instructed to execute N command sequences in a buffer. After the volatile memory module executes the N command sequences, in step 1003, according to M physical addresses involved in the N command sequences, at least one read command sequence is sent to instruct the volatile memory module to read first data from the M physical addresses.

As each step in FIG. 10 has been described in detail as above, the same is not repeated herein. It is worth noting that each step in FIG. 10 may be implemented as a plurality of codes or circuits, which is not limited in the application. In addition, the method of FIG. 10 may be adopted with the exemplary embodiments above, or may be adopted alone, which is also not limited in the application.

To sum up, according to the exemplary embodiment of the disclosure, after the notification signal from the volatile memory module is received, it is ensured the data (i.e., the first data) read through data retry-reading is the latest data, which reduces the occurrence of obtaining a mixture of both old and new data, thereby improving the operational stability of the system.

Although the application has been disclosed by the examples above, they are not intended to limit the application. Anyone with ordinary knowledge in the art can make changes and modifications without departing from the spirit and scope of the application. Therefore, the scope of the application shall be determined by the claims attached.

What is claimed is:

1. A data retry-read method for a volatile memory module, the data retry-read method comprising:
   detecting a notification signal from the volatile memory module;
   in response to the notification signal, instructing the volatile memory module to execute N command sequences in a buffer; and
   after executing the N command sequences, sending at least one read command sequence, according to M physical addresses involved in the N command sequences, to instruct the volatile memory module to read first data from the M physical addresses, wherein N is any integer greater than 1, and M is any integer.

2. The data retry-read method according to claim 1, further comprising:
   reading second data from the M physical addresses by executing the N command sequences in the buffer; and
   marking the second data read from the M physical addresses as invalid data without decoding the second data.

3. The data retry-read method according to claim 1, further comprising:
   in response to the notification signal, stopping adding any command sequence to a buffer circuit, wherein the buffer circuit is configured to provide command sequences to be executed to the volatile memory module; and
   after the volatile memory module executes the N command sequences, instructing the volatile memory module to execute remaining command sequences in the buffer circuit.

4. The data retry-read method according to claim 1, wherein the notification signal indicates that an access error has occurred in the volatile memory module.

5. The data retry-read method according to claim 1, wherein the buffer is configured to store command sequences that have been transmitted to the volatile memory module.

6. The data retry-read method according to claim 1, further comprising:
   sending at least one command sequence to a buffer circuit before detecting the notification signal from the volatile memory module;
   instructing the volatile memory module to execute command sequences in the buffer circuit; and
   the command sequences that have been transmitted to the volatile memory module in the buffer circuit are stored in the buffer.

7. The data retry-read method according to claim 6, wherein instructing the volatile memory module to execute the command sequences in the buffer circuit comprises:
   storing temporarily the at least one command sequence in at least one command register in the buffer circuit through a first multiplexer in the buffer circuit; and
   outputting one of the at least one command sequence through a second multiplexer in the buffer circuit for the volatile memory module to execute.

8. A memory storage device, comprising:
a connection interface element for coupling to a host system;
a volatile memory module; and
a memory control circuit element coupled to the connection interface element and the volatile memory module,
wherein the memory control circuit element is configured to:
  detect a notification signal from the volatile memory module;
  in response to the notification signal, instruct the volatile memory module to execute N command sequences in a buffer; and
  after the volatile memory module executes the N command sequences, send at least one read command sequence, according to M physical addresses involved in the N command sequences, to instruct the volatile memory module to read first data from the M physical addresses, wherein N is any integer greater than 1, and M is any integer.

9. The memory storage device according to claim 8, wherein the memory control circuit element is further configured to:
  instruct the volatile memory module to read second data from the M physical addresses by executing the N command sequences in the buffer; and
  mark the second data read from the M physical addresses as invalid data without decoding the second data.

10. The memory storage device according to claim 8, wherein the memory control circuit element is further configured to:
  in response to the notification signal, stop adding any command sequence to a buffer circuit, wherein the buffer circuit is configured to provide command sequences to be executed to the volatile memory module; and
  after the volatile memory module executes the N command sequences, instruct the volatile memory module to execute remaining command sequences in the buffer circuit.

11. The memory storage device according to claim 8, wherein the notification signal indicates that an access error has occurred in the volatile memory module.

12. The memory storage device according to claim 8, wherein the buffer is configured to store command sequences that have been transmitted to the volatile memory module.

13. The memory storage device according to claim 8, wherein the memory control circuit element is further configured to:
  send at least one command sequence to a buffer circuit before the notification signal from the volatile memory module is detected;
  instruct the volatile memory module to execute command sequences in the buffer circuit; and
  the command sequences that have been transmitted to the volatile memory module in the buffer circuit are stored in the buffer.

14. The memory storage device according to claim 13, wherein the buffer circuit comprises:
  a first multiplexer;
  a plurality of command registers coupled to the first multiplexer; and
  a second multiplexer coupled to the command registers,
  wherein the first multiplexer is configured to store temporarily the at least one command sequence in at least one of the command registers, and
  the second multiplexer is configured to output one of the at least one command sequence for the volatile memory module to execute.

15. A memory control circuit element for controlling a volatile memory module, the memory control circuit element comprising:
a host interface for coupling to a host system;
a memory interface for coupling to the volatile memory module; and
a memory management circuit coupled to the host interface and the memory interface,
wherein the memory management circuit is configured to:
  detect a notification signal from the volatile memory module;
  in response to the notification signal, instruct the volatile memory module to execute N command sequences in a buffer; and
  after the volatile memory module executes the N command sequences, send at least one read command sequence, according to M physical addresses involved in the N command sequences, to instruct the volatile memory module to read first data from the M physical addresses, wherein N is any integer greater than 1, and M is any integer.

16. The memory control circuit element according to claim 15, wherein the memory management circuit is further configured to:
  instruct the volatile memory module to read second data from the M physical addresses by executing the N command sequences in the buffer; and
  mark the second data read from the M physical addresses as invalid data without decoding the second data.

17. The memory control circuit element according to claim 15, wherein the memory management circuit is further configured to:
  in response to the notification signal, stop adding any command sequence to a buffer circuit, wherein the buffer circuit is configured to provide command sequences to be executed to the volatile memory module; and
  after the volatile memory module executes the N command sequences, instruct the volatile memory module to execute remaining command sequences in the buffer circuit.

18. The memory control circuit element according to claim 15, wherein the notification signal indicates that an access error has occurred to the volatile memory module.

19. The memory control circuit element according to claim 15, wherein the buffer is configured to store command sequences that have been transmitted to the volatile memory module.

20. The memory control circuit element according to claim 15, wherein the memory management circuit is further configured to:
  send at least one command sequence to a buffer circuit before detecting the notification signal from the volatile memory module;
  instruct the volatile memory module to execute command sequences in the buffer circuit; and
  the command sequences that have been transmitted to the volatile memory module in the buffer circuit are stored in the buffer.

21. The memory control circuit element according to claim 20, wherein the buffer circuit comprises:
  a first multiplexer;
  a plurality of command registers coupled to the first multiplexer; and a second multiplexer coupled to the command registers,
wherein the first multiplexer is configured to store temporarily the at least one command sequence in at least one of the command registers, and
the second multiplexer is configured to output one of the at least one command sequence for the volatile memory module to execute.

\* \* \* \* \*